(12) United States Patent
Kuka et al.

(10) Patent No.: US 9,069,120 B2
(45) Date of Patent: Jun. 30, 2015

(54) METHOD FOR MANUFACTURING A PREFORM AND PREFORM FOR DRAWING A MICROSTRUCTURED OPTICAL FIBER

(75) Inventors: Georg Kuka, Berlin (DE); Torsten Hähnel, Chemnitz (DE)

(73) Assignee: FIBERWARE GENERALUNTERNEHMEN FUER NACHRICHTENTECHNIK GMBH, Mittweida (DE)

( * ) Notice: Subject to any disclaimer, the term of this patent is extended or adjusted under 35 U.S.C. 154(b) by 397 days.

(21) Appl. No.: 13/544,550

(22) Filed: Jul. 9, 2012

(65) Prior Publication Data

US 2013/0011107 A1     Jan. 10, 2013

Related U.S. Application Data

(60) Provisional application No. 61/513,559, filed on Jul. 30, 2011.

(30) Foreign Application Priority Data

Jul. 10, 2011   (DE) .......................... 10 2011 107 511

(51) Int. Cl.
*G02B 6/032* (2006.01)
*C03B 37/025* (2006.01)
*G02B 6/02* (2006.01)

(52) U.S. Cl.
CPC ......... *G02B 6/02347* (2013.01); *C03B 2203/14* (2013.01); *C03B 2203/42* (2013.01)

(58) Field of Classification Search
CPC ..................... C03B 2203/14; C03B 2203/42
See application file for complete search history.

(56) References Cited

U.S. PATENT DOCUMENTS

2006/0104582 A1*  5/2006  Frampton et al. ............. 385/123
2010/0195678 A1   8/2010  Kuka et al.

FOREIGN PATENT DOCUMENTS

WO    WO 2004/038466    10/2003

* cited by examiner

*Primary Examiner* — Jerry Rahll
(74) *Attorney, Agent, or Firm* — Henry M. Feiereisen LLC

(57) ABSTRACT

In a method for manufacturing a preform for drawing a microstructured optical fiber, a core element and multiple sub-elements are arranged extending along the perform. The sub-elements and the core element form a bundle, which is twisted by a specified angle about the longitudinal axis of the bundle, wherein the pattern formed by the cross section of the sub-elements and the cross section of the core element is preserved along a length of the perform. The sub-elements and the core elements are subsequently at least partially fused together by heating the material of which the core element and the sub elements are made of above the transformation point of the material, so as to at least partially eliminate the cavities between the sub-elements, between the sub-elements and the core element, and between the sub-elements and the casing.

7 Claims, 3 Drawing Sheets

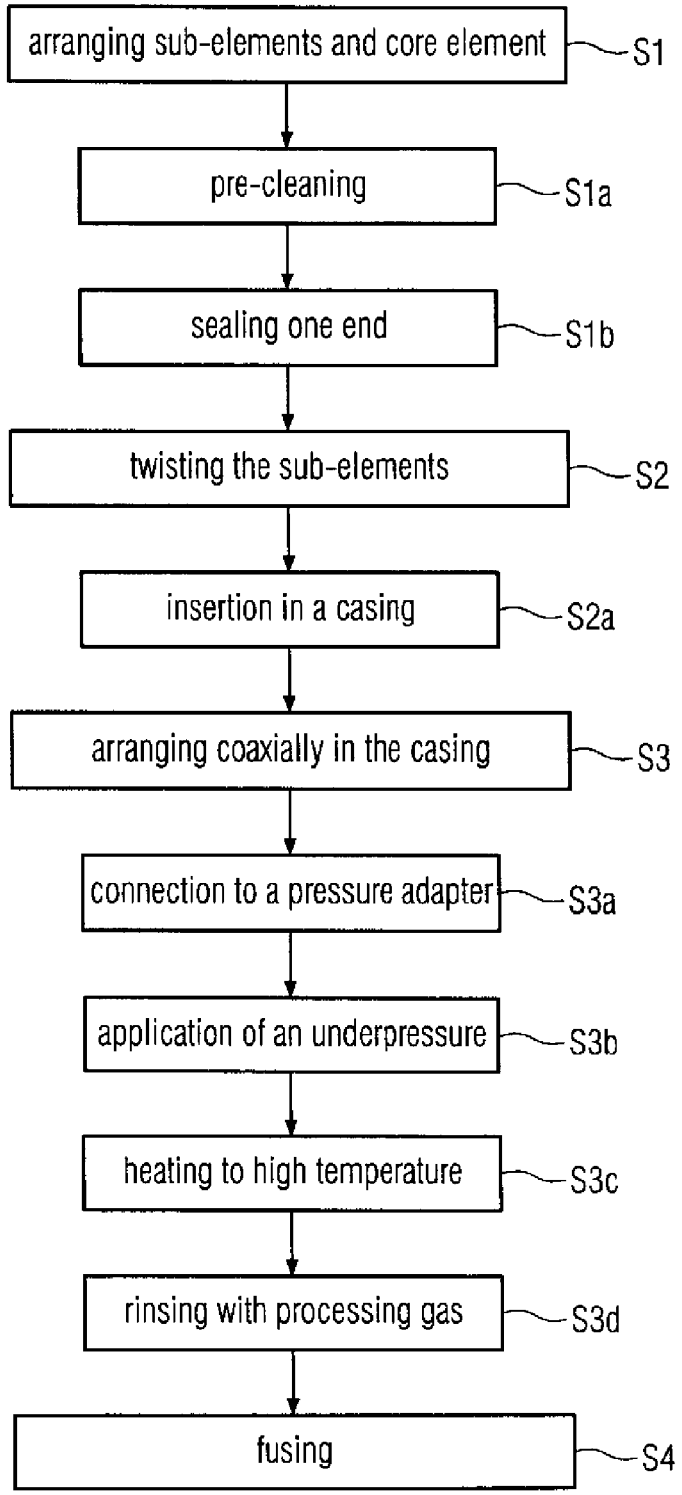

METHOD FOR MANUFACTURING A PREFORM AND PREFORM FOR DRAWING A MICROSTRUCTURED OPTICAL FIBER

CROSS-REFERENCES TO RELATED APPLICATIONS

This application claims the priority of German Patent Application, Serial No. 10 2011 107 511.2, filed Oct. 7, 2011, and the priority of U.S. Provisional Application Ser. No. 61/513,559, filed Jul. 30, 2011, the disclosure of which is incorporated herein by reference, pursuant to 35 U.S.C. 119 (a)-(d).

BACKGROUND OF THE INVENTION

The present invention relates to a method for manufacturing a preform and a preform for drawing a micro structured optical fiber.

The following discussion of related art is provided to assist the reader in understanding the advantages of the invention, and is not to be construed as an admission that this related art is prior art to this invention.

Microstructured optical fibers, also known as a sub-class called Photonic Crystal Fibers (PCF), are optical wave guide conductors, in which the light is conducted through a light conducting core, around which (for example) capillaries are arranged, which extend respectively along the optical fiber. In one particular design, the capillaries exhibit a hexagonal symmetry as seen in a cross section of the optical fibers, with the core in the center.

Microstructured optical fibers are drawn principally from cylindrical preforms (blanks), which are heated at the end in a drawing apparatus, to draw the optical fiber from the heated end of the preform.

The established preforms are manufactured from a casing (jacket) in the form of a glass tube, in which (for example) a glass cylinder is coaxially arranged as a rotationally symmetric core element within the casing. Furthermore, hollow cylinders in form of glass tubes are positioned around the glass cylinders in the casing. In particular, the hollow cylinders may be arranged periodically around the glass cylinder (the core element) with hexagonal symmetry, the cross section thus forming a polygonal pattern. The casing, the hollow cylinders, and the glass cylinder (the core element) are then fused in such a manner to form an overall structure or an overall system, so that the cavities between them are at least partially eliminated.

Instead of hollow cylinders, corresponding solid cylinders may also be used.

The established procedure to manufacture a preform for drawing a microstructured optical fiber have the disadvantage that during fusing to an overall structure, the hollow or solid cylinders very often fracture and do not permit a stable, reproducible fusing along the length.

It would therefore be desirable and advantageous to provide an improved method for manufacturing a preform for drawing a microstructured optical fiber to eliminate the strong tendency to fracture during fusing, and to ensure a reproducible long-term, stable fusing.

SUMMARY OF THE INVENTION

According to one aspect of the present invention, a method for manufacturing a preform for drawing a microstructured optical fiber includes the steps of arranging a core element and multiple sub-elements to form a bundle, said bundle having a longitudinal axis in collinear relationship with the perform, twisting the bundle by a specified angle about the longitudinal axis, wherein a pattern defined by a cross section of the sub-elements and by a cross section of the core element remains preserved along a length of the perform, inserting the bundle into a casing, and fusing the casing and the bundle at least partially together by heating the casing, the core element and the sub elements above a transformation point of a respective material of which the casing, the core element and the sub-elements are made, so as to at least partially eliminate empty cavities between the sub-elements, between the sub-elements and the core element, and between the sub-elements and the casing.

According to another advantageous feature of the invention, the preform is stretched with the twisted bundle to a specified length, and the extended preform is itself used as a sub-element.

According to another advantageous feature of the invention, during stretching only a single pressure or no pressure is applied to the (structures of the) preform.

According to another advantageous feature of the invention the pressure can be an underpressure.

According to another aspect of the present invention a method for manufacturing a preform for drawing a microstructured optical fiber, includes the steps of arranging a core element and multiple sub-elements to form a bundle, wherein the bundle has a longitudinal axis in collinear relationship with the preform, and wherein the core element has a cylindrical shape, twisting the multiple sub-elements by a specified angle about the longitudinal axis, wherein a pattern defined by a cross section of the sub-elements and by a cross section of the core element remains preserved along a length of the perform, inserting the bundle into a casing, and fusing the casing and the bundle at least partially together by heating the casing, the core element and the sub elements above a transformation point of a respective material of which the casing, the core element and the sub-elements are made, so as to at least partially eliminate empty cavities between the sub-elements, between the sub-elements and the core element, and between the sub-elements and the casing.

Suitably, the core element is not twisted along if it has the form of a cylinder, therefore being cylindrically symmetrical.

According to another aspect of the present invention a preform for drawing a microstructured optical fiber in a drawing apparatus, in which one end of the preform is heated and the optical fiber is drawn from the heated end of the preform, includes a core area which defines a longitudinal axis which is in collinear relationship with the perform, multiple substructure elements extending along the longitudinal axis and being helically arranged around the longitudinal axis; and a casing in surrounding relationship with the substructure elements, wherein a pattern defined by a cross section of the substructure elements varies along a length of the preform only as a function of a helical twist of the preform, and wherein the core element, the substructure elements and the casing are at least partially fused together With regard to the preform, the substructure elements are arranged helically around the longitudinal axis of the core region, wherein the pattern formed by the cross sections of the sub-elements as seen in the cross section of the preform, is respectively identical except for the angular rotation due to the helical structure, so that the pattern at one end of the preform is simply rotated by a specified angle in comparison to the pattern at the other end of the preform.

According to another advantageous feature of the invention, at least some of the substructure elements can be formed by stretching such a preform to a specified length.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 4 shows an embodiment of the method according to the invention in the form of a flowchart.

DETAILED DESCRIPTION OF PREFERRED EMBODIMENTS

Figure 1:
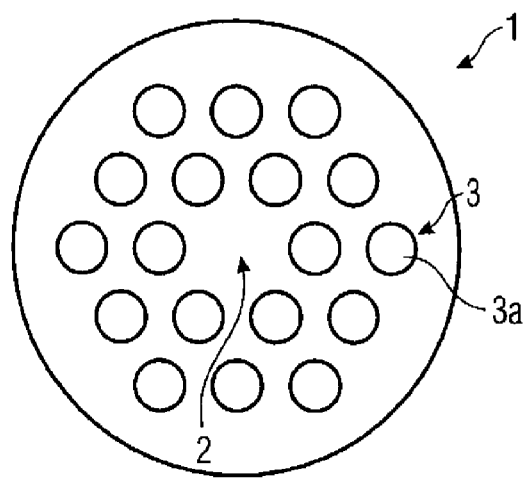
FIG. 1: shows the cross section of a preform.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown the cross section of a preform 1 for manufacturing a microstructured optical fiber. The preform 1 has the exterior form of a straight cylinder with a coaxial core area 2, around which substructure elements 3 are helically arranged in the form of cylindrical cavities 3a. The cylindrical cavities 3a are arranged periodically with hexagonal symmetry. Other arrangements and symmetries are of course also possible. The cylindrical cavities 3a may alternatively also be composed of doted solid material, thus formed as strands and equally arranged in helical form.

Figure 2:
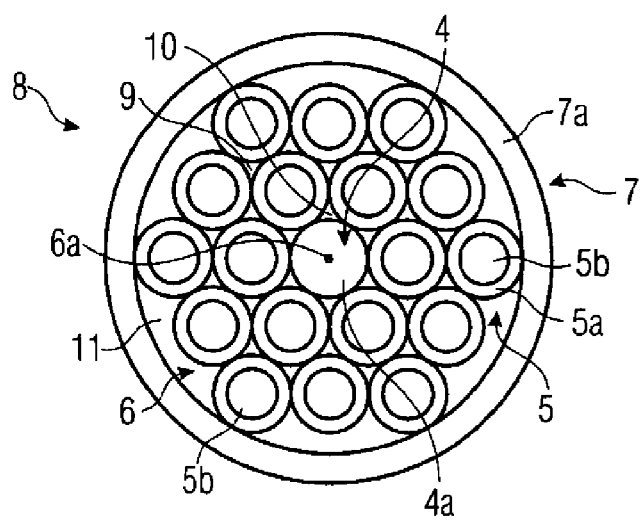
FIG. 2: shows a cross section of the preform in accordance with FIG. 1 before fusing.
Figure 3:
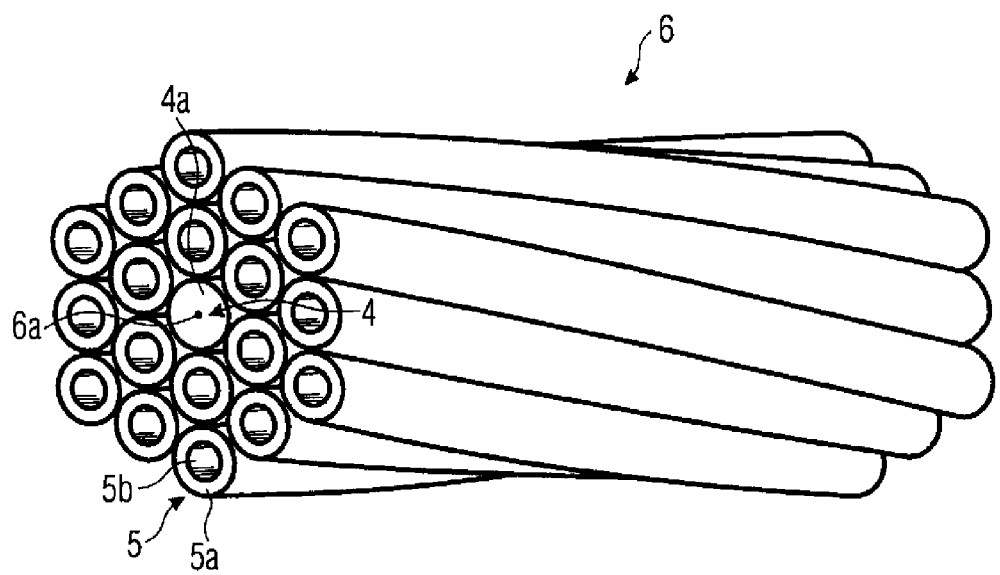
FIG. 3: shows the twisted hollow cylinder including the core element of the preform in accordance with FIG. 2.

A method to manufacture the preform 1 will be described below on the basis of FIG. 2, which shows a cross section of the preform 1 before fusing. The method begins with a solid cylinder (solid-core cylinder 4a) composed of glass, as rotationally symmetric core element 4, around which the hollow cylinders 5a are arranged as sub-elements 5. Alternatively, the core element 4 may also be composed of multiple solid cylinders and equivalents, thus for example of three solid cylinders. The bundle 6, formed by the solid-core cylinder 4a and the hollow cylinders 5a, and having the lengthwise axis 6a of the bundle, is pre-cleaned and sealed at one end, preferably fused. Then the hollow cylinders 5a are twisted by a specified angle, i.e., the longitudinal axes of the hollow cylinders 5a are arranged (stacked) appropriately with respect to the cylinder axis of the solid core cylinder 4a. The cylinder axis of the solid core cylinder 4a is generally the lengthwise symmetry axis of the rotationally symmetric core element, which coincides here with the lengthwise axis of the bundle 6a. The twisted bundle 6 is shown in FIG. 3. When the core element 4 comprises not just one, but instead (for example) multiple solid cylinders, it is then not cylindrically symmetrical, so the hollow cylinders 5a are twisted together with the core element 4 by a specified angle. For just a single solid cylinder as core element 4, the twisting of the solid core cylinder 4a may be left out; it 4a may also be twisted along with them. The other end of the bundle 6 will not be sealed after twisting and remains such as it was.

This bundle 6 (stack), sealed at one-end, is then inserted in an additional hollow cylinder 7a composed of glass as cylindrical casing 7 (jacket), whereby it is arranged coaxially in the casing 7.

The sealed end of this overall construction 8 is connected to a pressure adapter, to apply an underpressure to the spaces 9 between the hollow cylinders 5a, between the hollow cylinders 5a and the solid-core cylinder 4a, as well as between the hollow cylinders 5a and the casing 7. No pressure (and thus no underpressure) is applied to the cavities 5b in the hollow cylinders 5a.

The overall construction 8 is heated to a high temperature and rinsed with an extremely pure processing gas and cleaned in this manner. After completion of the cleansing method, a fixing method follows, in which the overall construction 8 is fused locally, beginning at the non-sealed end and up to the sealed end. The overall construction 8 is heated locally above the softening temperature (transformation point) of the respective (glass) materials in use; this occurs in the drawing oven, whereby the overall construction 8 is locally heated by the thermal zone in the drawing oven and is fused over its entire length by lengthwise procession through the oven. Because of the underpressure, the cavities 9, 10, 11 between the hollow cylinders, between the hollow cylinders and the solid-core cylinder, as well as between the hollow cylinders and the casing are completely eliminated during the fixing or fusing. However, it is also possible to perform the fusing so that the cavities 9, 10, 11 remain at least partially preserved. The lengthwise axis 6a of the core area 2 is the original lengthwise axis of the bundle 6a.

After the fixing method, the seal is removed and the preform 1 is once again provided with a pressure adapter. This is now followed by stretching the preform 1 to become a microstructured optical fiber, whereby an overpressure is applied to the cylindrical cavities 5b in the hollow cylinders 5a, to prevent a collapse of the cavities 5b, which thus form corresponding capillaries within the optical fiber, which then also extend helically around the fiber core.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for manufacturing a preform for drawing a microstructured optical fiber, comprising the steps of:

arranging a core element and multiple sub-elements to form a bundle, said bundle having a longitudinal axis in collinear relationship with the preform;

twisting the bundle by a specified angle about the longitudinal axis, wherein a pattern defined by a cross section of the sub-elements and by a cross section of the core element remains preserved along a length of the preform;

inserting the bundle into a casing; and fusing the casing and the bundle at least partially together by heating the casing, the core element and the sub elements above a transformation point of a respective material of which the casing, the core element and the sub-elements are made, so as to at least partially eliminate empty cavities between the sub-elements, between the sub-elements and the core element, and between the sub-elements and the casing.

2. The method of claim 1, further comprising before the fusing step cleaning the casing, the sub-elements, and the core element by heating and rinsing with a gas.

3. The method of claim 1, further comprising before the arranging step extending another said preform as produced in the fusing step to a specified length to thereby form the sub-element.

4. The method of claim 1, further comprising applying an underpressure to the empty cavities.

5. A method for manufacturing a preform for drawing a microstructured optical fiber, comprising the steps of:
    arranging a core element and multiple sub-elements to form a bundle, wherein the bundle has a longitudinal axis in collinear relationship with the preform, and wherein the core element has a cylindrical shape;
    twisting the multiple sub-elements by a specified angle about the longitudinal axis, wherein a pattern defined by a cross section of the sub-elements and by a cross section of the core element remains preserved along a length of the perform, and wherein the core element is not twisted;
    inserting the bundle into a casing; and
    fusing the casing and the bundle at least partially together by heating the casing, the core element and the sub elements above a transformation point of a respective material of which the casing, the core element and the sub-elements are made, so as to at least partially eliminate empty cavities between the sub-elements, between the sub-elements and the core element, and between the sub-elements and the casing.

6. A preform for drawing a microstructured optical fiber in a drawing apparatus, in which one end of the preform is heated and the optical fiber is drawn from said one end, comprising:
    a core area defining a longitudinal axis in collinear relationship with the preform;
    multiple substructure elements extending along the longitudinal axis and being helically arranged around the longitudinal axis; and
    a casing in surrounding relationship with said substructure elements, wherein a pattern defined by a cross section of the substructure elements varies along a length of the preform only as a function of a helical twist of the preform, and wherein the core element, the substructure elements and the casing are at least partially fused together.

7. The preform of claim 6, wherein at least one of the substructure elements is formed by stretching another said preform to a specified length.

* * * * *